(12) United States Patent
Kuzmanovic et al.

(10) Patent No.: US 10,327,214 B2
(45) Date of Patent: Jun. 18, 2019

(54) SYSTEM AND METHOD FOR RESOLVING NEIGHBORHOOD WIRELESS NETWORK AFFAIRS WITH RADIO SIGNALS

(71) Applicant: Northwestern University, Evanston, IL (US)

(72) Inventors: Aleksandar Kuzmanovic, Evanston, IL (US); Marcel Flores, Chicago, IL (US); Uri Klarman, Evanston, IL (US)

(73) Assignee: Northwestern University, Evanston, IL (US)

( * ) Notice: Subject to any disclaimer, the term of this patent is extended or adjusted under 35 U.S.C. 154(b) by 79 days.

(21) Appl. No.: 15/377,297

(22) Filed: Dec. 13, 2016

(65) Prior Publication Data

US 2017/0181112 A1    Jun. 22, 2017

Related U.S. Application Data

(60) Provisional application No. 62/270,276, filed on Dec. 21, 2015.

(51) Int. Cl.
| | |
|---|---|
| *H04W 56/00* | (2009.01) |
| *H04L 27/10* | (2006.01) |
| *H04W 72/12* | (2009.01) |
| *H04L 27/20* | (2006.01) |
| *H04W 84/12* | (2009.01) |

(52) U.S. Cl.
CPC ........... *H04W 56/002* (2013.01); *H04L 27/10* (2013.01); *H04L 27/2071* (2013.01); *H04W 72/1205* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2005/0020277 | A1* | 1/2005 | Krumm | G01C 21/28 455/456.1 |
| 2007/0050523 | A1* | 3/2007 | Emeott | H04W 56/001 709/248 |
| 2008/0112334 | A1* | 5/2008 | Laroia | H04L 5/0035 370/254 |
| 2009/0264149 | A1* | 10/2009 | Miller | H04H 60/13 455/552.1 |
| 2012/0120871 | A1* | 5/2012 | Jaeger | H04W 74/002 370/328 |
| 2017/0013556 | A1* | 1/2017 | Tanaka | H04W 16/14 |

* cited by examiner

*Primary Examiner* — Candal Elpenord
(74) *Attorney, Agent, or Firm* — Benesch, Friedlander, Coplan & Aronoff LLP

(57) ABSTRACT

A system and method include a wireless node with a scheduler and a harmonizing controller connected with the node. The harmonizing controller includes a processor and a memory, where the memory stores instructions, which when executed by the processor, causes the processor to receive a radio signal, process the radio signal to determine bits of the signal, and synchronize a wireless schedule of the scheduler with a schedule of other nodes based on the bits to perform neighborhood harmonization.

17 Claims, 10 Drawing Sheets

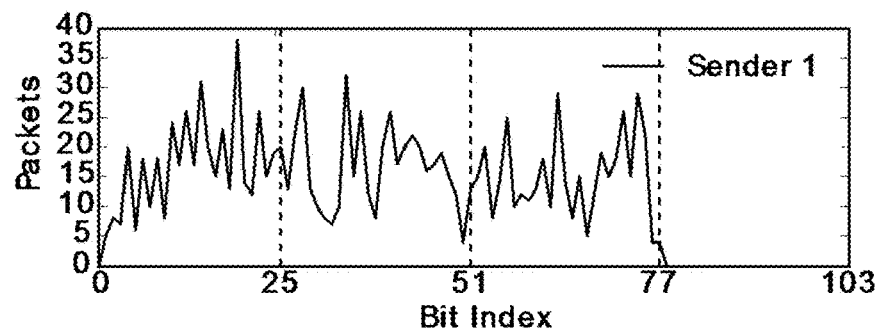
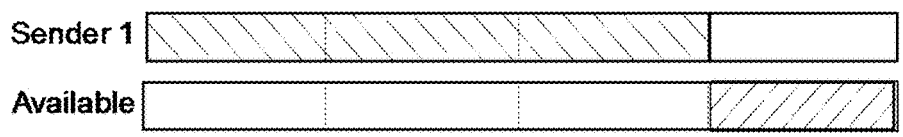
(a)
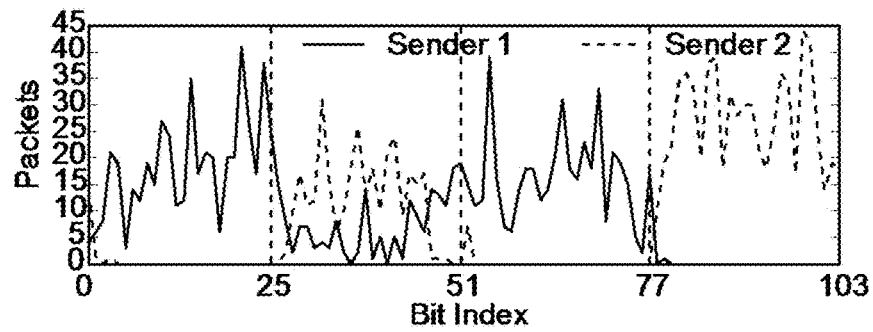
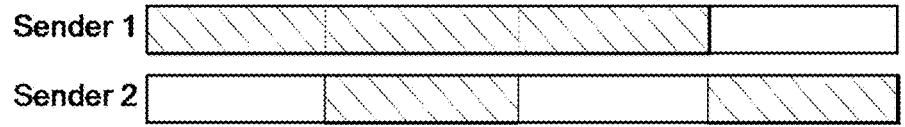
(b)
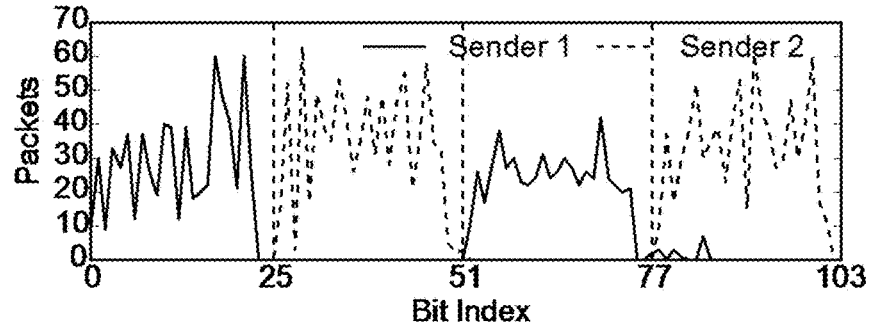
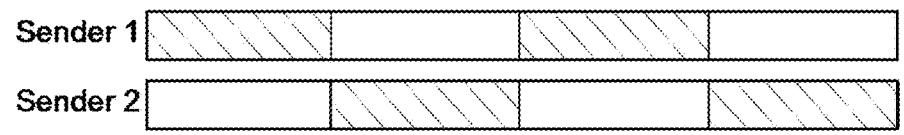
(c)
Figure 10A-C

SYSTEM AND METHOD FOR RESOLVING NEIGHBORHOOD WIRELESS NETWORK AFFAIRS WITH RADIO SIGNALS

CROSS-REFERENCE TO RELATED APPLICATIONS

This patent application claims the benefit of U.S. Provisional Patent Application No. 62/270,276, filed on Dec. 21, 2015, the entire contents of which is incorporated by reference in its entirety.

BACKGROUND

Homes can include complex networking environments with numerous devices utilizing the wireless spectrum in countless ways. In addition to the streaming and gaming applications which have become common-place, homes are increasingly becoming filled with a growing number of devices such as cameras, health and motion sensors, thermostats, etc. Unless a home is located in the "middle of nowhere," it is more than likely that neighboring home Wi-Fi networks can "step on each other's feet", e.g., associated network flows from different networks can interfere with each other, heavily affecting performance. The same can apply for businesses and other networking environments including vehicles, etc.

Many homes can have an overlapping Wi-Fi neighbor. Dispersed wireless home-network devices can be exposed to neighboring networks which are immeasurable from a single location. Periods of poor performance can be attributed to neighboring Wi-Fi transmitters. In addition to the dense private Wi-Fi deployments, a majority of networks use a single Wi-Fi channel. This indicates that the majority of home access points (APs) use a static Wi-Fi configuration, and are never re-assigned by residents after they are deployed.

Various methods to improve the performance of wireless networks include coordination and scheduling, resource sharing, deploying multiple in, multiple out (MIMO) algorithms, etc. Common to these efforts is that they address the problems in the context of managed, often also called enterprise, wireless networks. In such networks, all the APs are managed by a single authority, which certainly enables the deployment of collaborative protocols at different APs. While these methods are valuable in the managed network scenarios that they were designed for, they are inapplicable in many home network environments where each AP is individually managed by its owner.

BRIEF DESCRIPTION OF DRAWINGS

FIGS. 10A-C are examples of packets observed from a single sender folded onto the bit indices, packets observed after Sender 2 begins sending, and packets observed after Sender 1 has adjusted, respectively.

DESCRIPTION

I. Introduction

Figure 1:
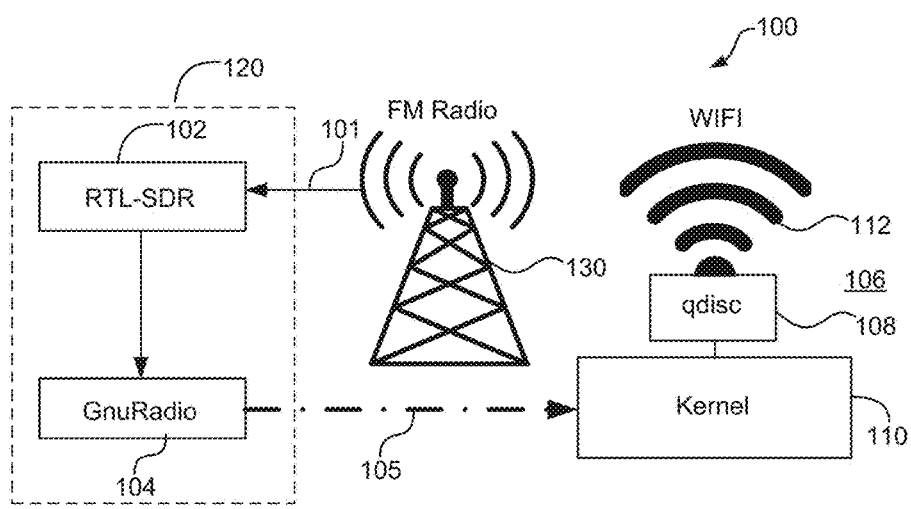
FIG. 1 is a system diagram of an example wireless with harmonized wireless traffic using the harmonizing controller.

The systems and methods can address problems that arise in unmanaged wireless networks by using signal from a frequency modulation (FM) radio. Smart phones and various other mobile devices manufactured contain an FM chip. The FM radio can be implemented together with Wi-Fi and Bluetooth on a single chip, making it easier for manufacturers to comprehensively integrate essential functionality. The deployment of FM receivers is not just users' demand for broadcast radio in their devices, but also an applicability in times of emergency: without power, land-line communication, mobile phone communication, or cable television, the only functioning source of information is "over the air" broadcasting. This enables users to receive FM radio broadcasts in a user's local area through a built-in FM tuner inside the mobile device. Beyond smart phones, the list of FM-enabled devices is growing, and coordinated efforts are underway to activate the FM functionality by the remaining carriers and in other portable electronics.

The FM radio, typically broadcasting in about the 87 to 108 Mhz range, is widely available in urban areas and beyond. For example, smart phones and many other consumer electronics today have a built-in FM chip. Unlike global position system (GPS), FM signal successfully penetrates buildings. Unlike cellular 3G/4G or TV, FM radio receiver hardware is becoming freely available on mobile devices. In some implementations, the ubiquitous in-the-air and on-device FM radio availability can address some wireless networking problems. The broadcast FM signal can be utilized, in particular a digital signal that accompanies broadcast FM radio, the Radio Data System (RDS), as a medium to effectively harmonize neighboring Wi-Fi devices relative to the baseline RDS signal. The RDS digital signal that accompanies broadcast FM radio has sufficient structure to enable effective scheduling. The RDS-relative neighborhood harmonization can resolve scenarios when nodes, e.g., both stations (STAs) and access points (APs), from unmanaged networks systematically "step on each other's feet," e.g., interfere and degrade each other's performance. It provides a common reference for neighboring devices to harmonize their transmissions, yet without requiring any explicit communication among them. Therefore, the systems and methods can enable mutually-beneficial, autonomous, and implicit harmonization among Wi-Fi devices across administrative network bounds.

A harmonizing controller of the systems and methods utilizes existing ambient FM signals to perform neighborhood harmonization. The harmonizing controller can make use of the fact that a broadcast radio signal reaches all devices at a location at virtually the same time, which helps synchronize all nodes relative to this signal. Unlike many synchronization methods, the harmonizing controller generates no in-band traffic while synchronizing with the ambient signal: neither in-band beacons nor additional node-to-node synchronization messages. Rather, it can rely on identifying time landmarks in the form of repeated patterns in the structure of the underlying digital RDS signal. Because all participating nodes do this independently, they do not partake in any explicit communication among themselves. This enables the harmonizing controller to effectively harmonize Wi-Fi nodes transmitting in the same channel, even when they belong to independently-managed autonomous wireless networks.

Once synchronized to the RDS digital signal, the nodes can effectively sense the environment and infer the other nodes' scheduling choices over short time-scales. With this information, the harmonizing controller allows arriving senders to determine how best to approach a given network state. The harmonizing controller can differentiate between light and heavy traffic scenarios, providing mechanisms for the full use of the network in quiet cases, sharing of the network in the case of both light and heavy traffic via negative scheduling, and more complex conditions for cases when many heavy-traffic devices coexist in the network via a neighborhood fairness algorithm.

The following description illustrates: (i) It is possible to effectively detect and select a common FM station in a neighborhood and utilize them for network harmonization. (ii) The RDS digital signal accompanying voice, music and other signal from FM radio has a sufficient structure to enable RDS-relative harmonization. (iii) This signal is highly resilient to data loss, e.g., it retains device harmonization even in the presence of substantial reduction of matching bits. A software-determined radio implementation can provide sufficient synchronization accuracy to allow for scheduling based on the ambient FM signals. (vi) Examples on realistic networking setups show scenarios where throughput is improved. The harmonizing controller can systematically reduce contention via network harmonization. Other features can include the following: the harmonizing controller can utilize the FM broadcast radio signal, e.g., the associated digital RDS signal, as a vehicle to boost the performance of Wi-Fi networks; the harmonizing controller can enable Wi-Fi device harmonization across administrative network bounds in unmanaged network scenarios; and hardware-level FM radio signal processing implementations can open the doors to the deployment of advanced wireless networking algorithms and applications, beyond neighborhood harmonization.

FIG. 1 is a system diagram 100 of an example wireless network provided with harmonized wireless traffic using the harmonizing controller 120. The wireless network can include an Institute of Electrical and Electronic Engineers (IEEE) 802.11 Wi-Fi network, and/or other networks including but not limited to Bluetooth™ and other technologies. The harmonization controller 120 can include a software defined radio (SDR), e.g., a NooElec RTL-SDR DVB-T USB stick 102 and a GNURadio 104 to receive and process an FM RDS signals 101. The DVB-T USB stick 102 can use a Rafael Micro R820T tuner, and a Realtek™ RTL2832U as a de-modulator and USB interface. In one example, the tuner provides a full range of about 25 MHz to 1,750 MHz, which enables greater coverage than the about 87.5 to 108 MHz used by traditional FM broadcasters in Europe and the United States. Harmonization controller 120 with other signal ranges can be used.

Nodes 106 in a harmonized network can include a Kernel 110 running on a processor for executing a network traffic scheduler, e.g., qdisc 108. In one example, the nodes 106 operate using Arch Linux 3.17.4 on 3.3 Ghz Intel I5 processors. Other operating systems and processors can be used. Nodes 106 can also be equipped with a USB radio and a radio frequency antenna 112, e.g., TP-Link TL-WDN3800 2-antenna 802.11n PCIe card for sending Wi-Fi signals throughout the network. The 802.11n cards can run on the Atheros Ath9k driver, which allows the machines to act as access points (APs), additional or alternative to stations (STAs), when needed. In such scenarios, Hostapd can be used to provide software access points. To process raw data from the FM radio 130, the GNURadio 104 can perform digital signal processing. An example radio processing path includes the software defined radio (SDR) 102 receiving the RDS signal 101 sent by the FM radio 130, the GnuRadio 104 performing digital signal processing on the received RDS signal 101, and the processed bits 105 are sent to the Kernel 110 of the node 106, which handles schedule processing by synchronizing the schedule with the schedule of other nodes based on the processed bits 105, as described in more detail below. A modified version of the Plug queuing discipline can be used to control when a node 106 is able to send. The modification of the queue discipline can implement the sending behavior of a node. The sending behavior can be implemented in many different ways, and in this example is implemented by changing the queue discipline. Further, the available buffer can be decreased on each card to limit the amount of transmitting the card can do after the qdisc 108 is disabled.

Figure 2:
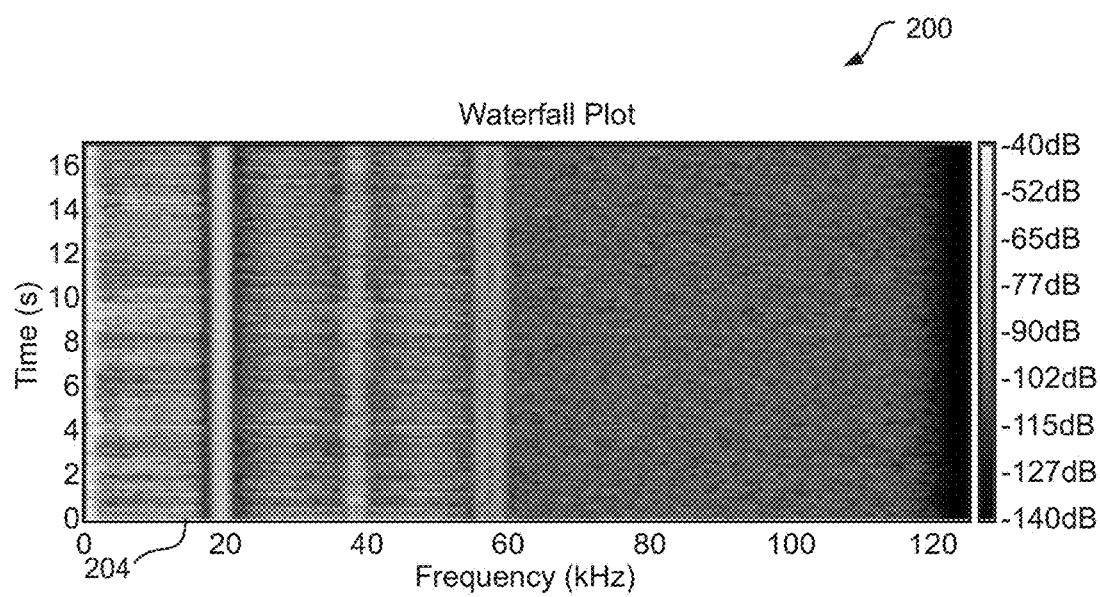
FIG. 2 is a waterfall plot of an example frequency modulation (FM) radio signal in which a radio data system (RDS) digital signal can be seen as two lines at the 57-kHz subcarrier.

FIG. 2 is a waterfall plot 200 of an example frequency modulation (FM) radio signal in which a Radio Data System (RDS) digital signal 101 can be seen as two lines at the 57-kHz subcarrier. The RDS signal 101, also called the Radio Data Broadcast System (RDBS), is a repetitive digital signal that accompanies broadcast FM radio. Intended as a method for improving usability of radios, these digital signals convey station information, current program details, traffic alerts, and other information. Most of this information is then presented to listeners directly through their radio's interface. Radio listeners may be familiar with RDS as the mechanism that communicates the data needed to print the song title and artist on their car stereo.

To avoid interfering with legacy radio devices, RDS data is broadcast at the third harmonic of the 19-kHz pilot-tone 204. The RDS signal 101 can be found at the 57 kHz±6 Hz subcarrier frequency, which is modulated with a form of two-phase PSK. The clock frequency of the arriving data is given by dividing the transmitted subcarrier frequency by 48, which provides a data-rate of 1187.5 bps. The transmitted bits are further subject to differential coding in order to remove ambiguity in the signal.

Baseband Coding

The RDS system provides a baseband coding in order to communicate data to the receivers. For the sake of explanation a basic format is used in order to allow understanding of an example overlay scheme. The RDS system has a complex set of messages and communication modes that allow it to communicate a rich set of data in a careful fashion. Each mode provides a set of repeatable patterns that can be used for resolving neighborhood wireless network affairs.

Figure 3:
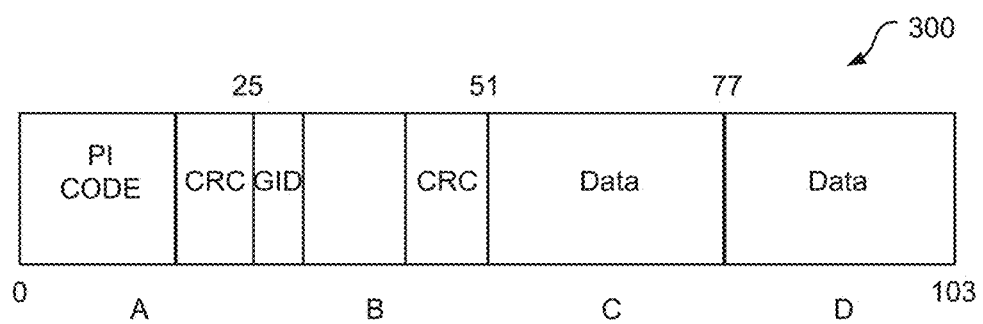
FIG. 3 is a base encoding layout of an example RDS scheme in which the bits repeat and the value of the data depends on the current group context.

FIG. 3 is a base encoding layout of an example RDS signal 101 scheme in which the bits repeat and the value of the data depends on the current group context. The first layer of the coding is known as a group 300, which includes 104 bits. Each group is broken down into four 26 bit blocks 302: Block A (bits 0-25), B (26-51), C (52-77), and D (78-103). Each block 302 includes 16 bits of data, and 10 bits of checkword to allow for error detection and some correction. The checkword is encoded with an offset, which indicates the current block.

To provide a basis for scheduling, additional components of the RDS structure can be used. First, each broadcasting station has a unique code known as a Program Identifier (PI) code. This data is included in the first 16 bits of Block A. Second, the first 4 bits of Block B provide a group code, which indicates what type of data is contained in the remaining blocks in the group. While there are no hard requirements on the distribution of group codes in the stream, the RDS specification provides typical use guidelines, further providing for reliable repetition of group codes over time.

The RDS signal 101 specification further provides 13 group codes and 2 formats for each code, resulting in 26 possible message formats. The internal structure of each of these groups allows for additional repeated structure. For example, a group 2 message specifies a small amount of display text, up to 64 characters. Specifically, the final 4 data bits of Group B are used to specify a text segment (e.g., an offset), and Groups C and D are used to specify 4 characters of data. The bottom line is that there exist numerous time landmarks in the underlying RDS signal 101. Such landmarks can be extracted and utilized for Wi-Fi network harmonization. An example approach is explained next.

III. Network Harmonization Architecture

An example architecture that utilizes the harmonizing controller 120 for the network harmonization is described, and details are provided of how to use ambient FM radio signal to enable Wi-Fi device harmonization across administrative network domains, e.g., for use in the home, in vehicles, commercially, etc. The RDS signal 101 described in the previous section can be used to achieve this purpose. In some implementations, additional or alternative signals to RDS may be used, e.g., other types of digital or analog signals.

Synchronizing to the Ambient RDS Signal

A first component of an example harmonization scheme is an example treatment of time. As digital signal, the smallest increment available from RDS is a single bit. Since RDS features a data rate of 1187.5 bps, or approximately 842 µs per bit, this can be treated as an example basic time unit. In one implementation, packet-level scheduling may not be of interest, but tighter time-scales are feasible. In such scenarios the bits from the RDS signal 101 are simply utilized as broadcast beacons. Further an example time can be aligned to the 104 bit groups provided by the baseband coding. Hence, any time can be represented as the most recent bit to arrive in the current group, and can therefore be referred to by its bit index. Since all machines receive the broadcast radio signal at nearly the same time, all machines receive the same bit at virtually the same time, as described below.

To begin, the node 106 can process the RDS bits one by one, attempting to match that station's PI code to the stream. When the node 106 encounters the code, which it recognizes via the checkword, it enters the synchronized state and resets its current bit index to 0. Once synchronized, the system no longer considers the value of each arriving bit, but instead uses it as a counter to determine the current bit index. When the system reaches 104, it resets the count to 0, and begins checking for the PI code again. If it encounters the PI code where expected (e.g., 104 bits after the last occurrence), the state remains synchronized and the process is repeated.

If, on the other hand, the system fails to detect the PI code, it returns to the unsynchronized state and begins checking for the code at each bit. The next time the PI code is encountered, network harmonization is able to return to the synchronized state. Losses of synchronization can occur as the result of radio interference scrambling the arriving bits or processing lag, which may cause some bits to be dropped. The frequency of such issues are described in Section V. Time spent in the unsynchronized state can be reduced by employing a handful of heuristics. First, whenever a PI code is expected but not found, an XOR can determine how many of the bits match. If more than half of the bits are correct, it is likely that a small number of errors have occurred exactly on the PI code, but synchronization can be maintained. Second, the checkword at the end of each block can be used to correct a burst error up to 5 bits. In this way, the harmonizing controller 120 is able to use the PI code as a repetitive time-landmark in the underlying RDS format.

Station Detection

When the harmonizing controller 120 is activated, it determines the most suitable FM station available to use for harmonization. To this end, it can first perform a simple scan of the FM spectrum, building a list of potentially available stations. Additionally or alternatively, the system can determine potential nearby stations using the devices coarse-grained location (for example, zip code). The harmonizing controller 120 then tunes to each candidate station, starting at the lowest frequency. It does so for 2 seconds per station, attempts to synchronize as above, and measures the fraction of time it spends in the synchronized state. The search terminates when the list of candidates is exhausted, or the harmonizing controller 120 detects three stations with at least 95% sync rate, for example. It then selects the lowest frequency station from these 3, or the station of the highest sync rate, if no station above 95% sync rate is detected. In Section V, this approach is confirmed, e.g., that high sync-rate stations are available and that nodes 106 in a single area can converge to a single such station in a short time.

RDS—Relative Neighborhood Harmonization

To harmonize with neighboring signals, the harmonized network nodes 106 independently determine a schedule during which it is best to transmit. For example, each node 106 observes the current network state, determines during which RDS defined blocks other nodes 106 are sending, and selects a schedule (e.g. a set of blocks during which to transmit) which can result in the best performance by minimizing contention in each block. Each node 106 can make these decisions independently, without the aid of a centralized scheduler.

1) Assessing Outgoing Traffic: First, a wireless node 106, whether an AP or STA, determines if there is benefit to applying a schedule, or if fairness and performance are best served by continuing normally with the distributed coordination function (DCF). If only generating light traffic, it can be best to simply send when available, as shown in centrally-coordinated managed wireless networks.

Benefits can be seen if longer flows are regulated. To make this determination, the harmonizing controller 120 keeps track of the amount of time in which there are packets in the outgoing buffer of a node 106. If the buffer is non-empty for more than 2 seconds, for example, the harmonizing controller 120 employs the below algorithm to determine the best course of action. Other time thresholds can be used. Alternatively, application level feedback can indicate the presence of longer flows, reducing sensing time, but requiring application support.

2) Assessing the Network State: If the outgoing traffic patterns indicate that a schedule is necessary, the harmonizing controller 120 measures the current traffic on the network so that it can select an appropriate schedule to harmonize with that traffic. For example, with only light traffic, it may make sense for a heavy sender to make space, to allow light flows to proceed more quickly. In the case of other heavy senders, the harmonizing controller 120 attempts to reach a state of effective harmonization. To measure the state, the harmonizing controller 120 samples the current traffic for one group, e.g., 87.6 ms, and considers the times packets were sent from each other sender. It then determines during which RDS bit index each packet arrived, declaring a bit to be active for a sender if a packet arrived during its time period. If more than half of the bits are active in any slot, that sender is declared a heavy hitter, otherwise they are a light sender. This process is repeated periodically to reevaluate the current competing traffic.

3) Determining an Appropriate Schedule: Finally, the harmonizing controller 120 selects a schedule which offers the most potential for performance gains given the observed traffic. Consider the following potential scenarios:

No Traffic. In the case in which the harmonizing controller 120 detects no other senders, the system takes all available slots as its schedule. In the case when there are no other senders it makes the most sense to use all available resource. However, in neighborhood settings, this scenario is expected to occur rarely.

Light Traffic. When the harmonizing controller 120 detects only light senders, taking the entire schedule results in significant performance degradation for the light flows sharing the wireless medium, as shown below. In the case that these light flows are user web browsing, even small increases in delay can result in a degraded user experience. Therefore in such cases, it implements a negative schedule. For example, it restricts itself to about ¾ of available slots, allowing light flows to operate unhindered for a time. Other restriction values can apply, e.g., depending on an implementation.

Heavy Single-Sourced Traffic. In the presence of a heavy hitter, the harmonizing controller 120 selects its schedule in a way that carefully shares with existing flows. If the detected heavy hitter, call it Sender 1, uses more than its fair share, e.g., more than half of available slots, the harmonizing controller 120 chooses a schedule of half of the slots, taking any empty slots if available. When Sender 1 reevaluates the network state, it can see that it is now sharing with an additional heavy hitter and reduce its schedule accordingly, resulting in an even split of network traffic. If, in subsequent iterations, the harmonizing controller 120 detects that Sender 1 has not adjusted their schedule, for example if Sender 1 is a legacy device, the harmonizing controller 120 reverts to traditional DCF in order to remain competitive.

Heavy Multi-Sourced Traffic. In the case that the harmonizing controller 120 detects a state which features multiple heavy-hitters, it determines a suitable schedule that provides it with a reasonable share of sending time while still attempting to provide a fair use of resources. The harmonizing controller 120 therefore considers three criteria for the selection of a schedule.

First, let set S be all the observed senders. Next, denote by li the number of active slots for sender i. Then, the number of slots allocated is equal to the average of the other observed transmitters. Formally, $$k = \text{slots to schedule} = \frac{\sum_{i=1}^{s} l_i}{|S|}. \quad (1)$$

This ensures that the harmonizing controller 120 offers its local node 106 a competitive amount of radio time. In a scenario where nodes 106 behave in a greedy manner or simply do not deploy the network harmonization algorithm, the harmonizing controller 120 can necessarily behave greedily as well, and hence the system can converge towards the underlying DCF protocol. Later it is described that Wi-FM can outperform the underlying DCF protocol, providing clear incentives for users to deploy the harmonizing controller 120.

Second, the chosen slots minimizes the number of concurrent senders in each slot. To do so, it attempts to choose those slots which are quietest, reducing radio contention. Denote by Bk the slots in which an example sender is scheduled, and ci is the number of concurrent senders observed in the ith slot. Therefore, an example goal is to minimize $$\text{total contention} = \Sigma_{i \in Bk} c_i. \quad (2)$$

Finally, all else being equal, the harmonizing controller 120 attempts to select slots which fairly distribute the new load. Denote by B the set of all slots. Let pi be 1 if the node 106 is active in slot i∈B and 0 otherwise, ci is the number of concurrent senders in i, and S is the set of observed senders. It is desired to minimize the distance of each node 106 from its fair share, $$\text{fairness error} = \left| \frac{|B|}{|S|} - \sum_{i=1}^{B} \frac{Pi}{Ci} \right|. \quad (3)$$

Formula (1) can be satisfied with a simple computation. To limit contention as required by (2), the harmonizing controller 120 first sorts the slots by the number of concurrent senders. Suppose the average sending length is currently k slots and there are n slots with a minimal number of concurrent senders. If n≤k, Wi-FM chooses these n slots and moves on to the next smallest number of concurrent senders with the remaining k−n in the same fashion. If n>k, (3) requires that the k slots attempt to fairly distribute its load among the senders with which it is conflicting.

Naively, the harmonizing controller 120 can consider all possible choices of k slots, compute the number of times that it collides with each sender, and choose the schedule which minimizes the maximum number of collisions. However, such an algorithm can come with significant complexity. Alternatives include greedy algorithms which simply select the first available slots which do not conflict with a sender that conflicted previously. Given the complex and often dynamic nature of network behavior, the harmonizing controller 120 can opt to choose randomly among the n slots, as this provides effective results, given that the number of concurrent senders has already been minimized.

None of the above described scenarios require that any of the senders belong to the same network: the network sampling, harmonization, and scheduling happen locally, based on measurements by each node 106. In home-use settings, this can result in improvement with both a user's local network and amongst neighboring networks in the immediate area.

IV. Example Implementation

Figure 4:
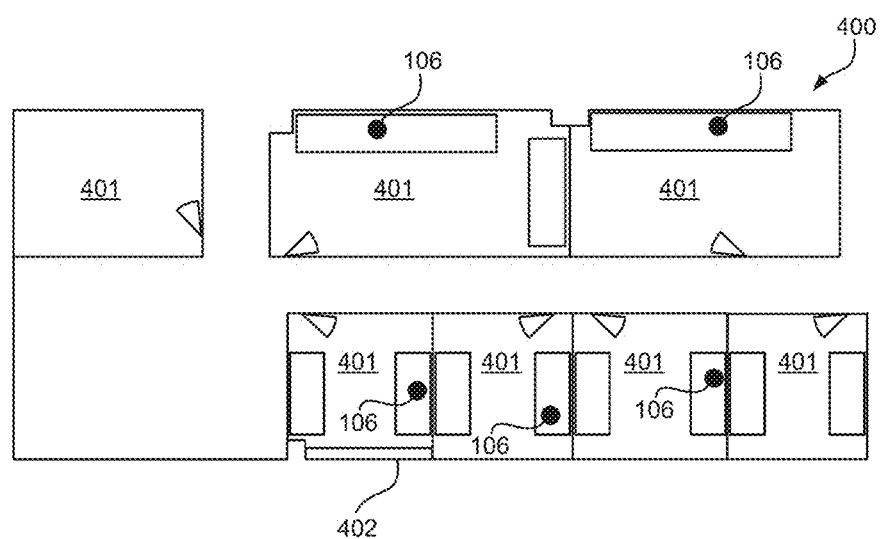
FIG. 4 is a floor plan of an example testbed in which dots can indicate access points (APs) and/or stations (STAs), depending on the implementation.

The nodes 106 can be placed in various locations around the rooms 401 and/or other locations at an example building 400 to form networks. An example layout can be seen in FIG. 4 but other layouts can be used. The nodes 106 are placed both near windows 402 and internally, in single or in a multi-story buildings, providing a variety of radio conditions. Furthermore, an example test-bed is in a relatively crowded wireless area: a large number of wireless networks and devices are constantly visible. This layout can present a reasonable example of a network environment and the amount of contention that can exist between overlapping senders.

The DCF is restrained from being disabled, allowing the harmonizing controller 120 to take share air-time when necessary, e.g. non-participating devices, overlap, and failure scenarios. In some examples, Request to Send and Clear to Send (RTS/CTS) features are disabled to prevent the APs from performing any additional scheduling that might create additional interference. This is a common optimization in many networks, as it adds latency in many scenarios. Finally, the 26-bit (approximately 21.89 ms) blocks are selected as an example time slot. This provides 4 time slots per group. Such a choice enables sufficient flexibility in scheduling, while limiting the potential increase in delay for a single sender. Note that the methods described, however, are generic, and stand to work for any number of available time slots.

IV. FM Radio Properties

The harmonization controller 120 evaluates FM radio 130 properties, e.g., FM station availability and neighborhood spatial consistency, as well as RDS signal 101 quality. For the sake of explanation, the processing and utilization of this signal is then analyzed below.

A. FM Station Consistency

In a sample of available radio stations in the bottom half of the FM radio range, e.g., from 87.5 to 97.75 MHz, the harmonizing controller 120 is able to read RDS signal 101 from five different FM broadcasters. Only the bottom half of the range was used, as a sufficient number of stations are detected early in the scan. In this example, short 2 second samples of each of these stations reveals two stations which are able to achieve greater than 95% sync rates, while one of the remaining achieves a 73% sync rate, and the final two obtain below 10%. A further 2 minute sample of these stations is in agreement, with the two strongest stations remained synchronized for nearly 100% of the example duration, while the other performed approximately as before, below the thresholds described in Section III-A.

The similarity between the short samples and the longer 2 minute samples suggests that the synchronization can be accurately assessed on short time scales. All the nodes 106 in an example testbed obtained the same results and converged to the same RDS signal 101. They all selected the lower frequency of the two qualifying stations. This station can be used as an example leading harmonization signal in the remainder of the paper.

B. RDS Signal Consistency

If the RDS signal 101 received at all of an example network devices matches is described next. If the nodes 106 are receiving significantly different signals, they are able to schedule transmissions with a reasonable accuracy. To test this, radio signal at all 5 nodes 106 are collected for 5 minutes. A single random node 106 is designated as the reference signal. Necessarily, the reference signal itself may have errors. Hence, simultaneous errors at all other nodes 106 likely indicates an error with an example reference. Then for each group of 104 bits, the fraction of bits that match the reference is measured.

Figure 5:
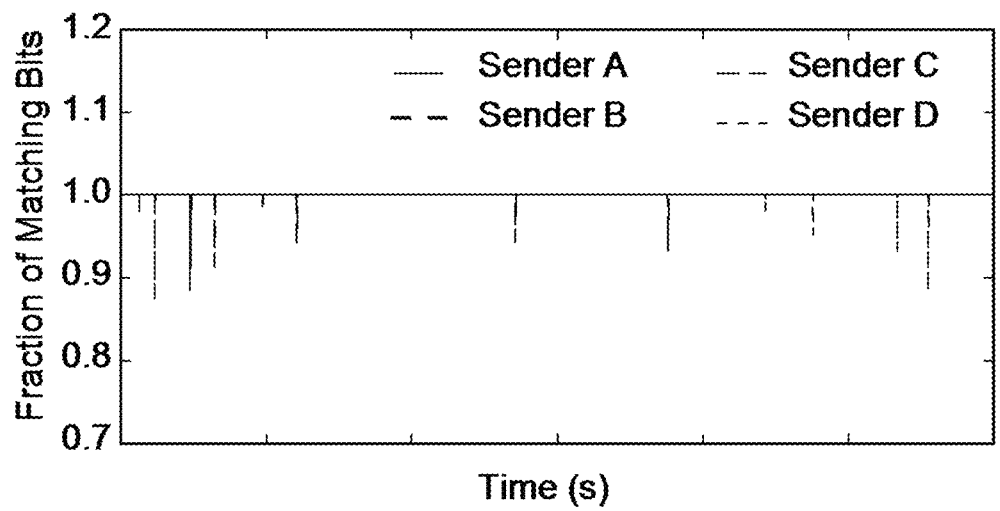
FIG. 5 is an example fraction of bits that matched the reference for each group.

FIG. 5 shows the result of an example harmonized network. While each node 106 did encounter differences, and therefore some bit errors, the received signals matched extremely closely. Furthermore, while the fraction of matched bits reaches as low as 0.89 at discrete points in time, all nodes 106 maintained full synchronization for the entirety of the example. This stability arises from the fact that the errors never fell on the synchronizing PI codes, and as such caused no change in performance in an example system. Moreover, as discussed above, an XOR scheme can retain synchronization even when PI codes are partially corrupted.

C. Software Delay

An example implementation of harmonized network may include delay due to the time spent on radio processing and internal switching, resulting in some timing error. To develop an understanding of the magnitude of such error, the following example is provided. Two nodes 106, A and B, simultaneously listen to the RDS signal 101 for one minute. When they encounter the station PI code, node A records its current local time, and node B sends a single UDP packet to node A over the wired network. Node A records its local time at the arrival time of the packet from node B. Both timings are therefore recorded at node A using its local time stamp counter. Node A then notes the difference between these two times. This difference includes potential difference in processing delay, as well as the network delay between the two nodes 106.

Figure 6:
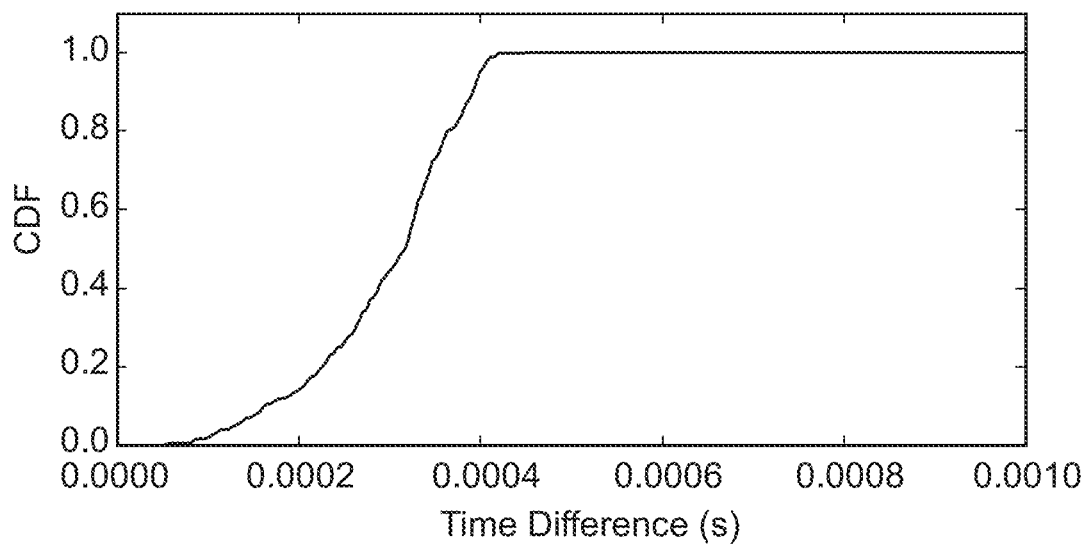
FIG. 6 is an example timing error between two nodes over a one minute period.

To establish an understanding of the expected network delay between the two nodes 106, ping measurements are performed between the nodes 106 every second for five minutes, and took the delay to be half the average round trip time. This gave an average network delay of 371 µs, with a variance of about 100 µs. FIG. 6 plots the CDF of the absolute difference of the recorded times less the expected value of the network delay. While there is some variation, an example overall error has a median value of around 300 µs, and a variance of about 100 µs, similarly to the wired network variance reported above.

From the harmonized network's perspective, these results indicate that time variations are small enough to avoid damaging the synchronization state between nodes 106. Furthermore, it can result in very little wasted time when switching between blocks, e.g., switching between senders. While this number can be further improved via software and hardware optimization, e.g., as discussed in Section VII, the achieved time-scales serve the core harmonized network's purpose. Moreover, harmonized network nodes 106 simultaneously synchronize to an out-of-band signal without any communication among themselves. Such an ability is most relevant in neighborhood scenarios, when devices belong to different, non-managed networks, hence cannot explicitly communicate.

VI. RDS—Relative Neighborhood Harmonization

This section considers the performance of networks running the harmonizing controller 120 in a number of scenarios and shows how adding relatively straightforward timing to the dynamics of the wireless network, specifically reducing contention transmission time, can have notable positive effects on the systems performance.

A. Light Traffic Scenario

First, the applications of the harmonizing controller 120 to a network is considered which experiences light ambient traffic (sourced either in this or in neighboring networks), yet concurrently experiences a large amount of up-link traffic. In particular, the case when a STA uploads data to the AP, and likely out to the wider Internet. These scenarios are likely to grow in frequency, as users increasingly generate more data, both from applications responsible for data syncing between devices (iCloud™, Dropbox™, etc.), and sensors in the environment. In such scenarios, these bulk transfers may dominate radio time, potentially greatly decreasing the performance for other small flows, for example other users performing light web browsing. The harmonized controller 120 determines a schedule is appropriate for the STA, and a sample of the network allows it to detect the presence of light flows.

The harmonizing controller 120 can therefore employ a negative schedule that uses ¾ of the available slots, as described in Section III above.

To test the performance of the harmonizing controller 120 in this case, the following example setup can be used. A set of light flows are sent from two STAs, denoted by Sender 2 and Sender 3, to the AP. These flows consist of short requests, followed by variable length responses from the AP. Request times are modeled as Poisson arrivals with a mean arrival time of 1 s, with a Pareto file size distribution for responses with a mean of 125 KB and shape 1.5. To model the up-link traffic, a single STA (denoted by Sender 1) performs a bulk transfer to the AP for the 5 minute duration of the example.

Figure 7:
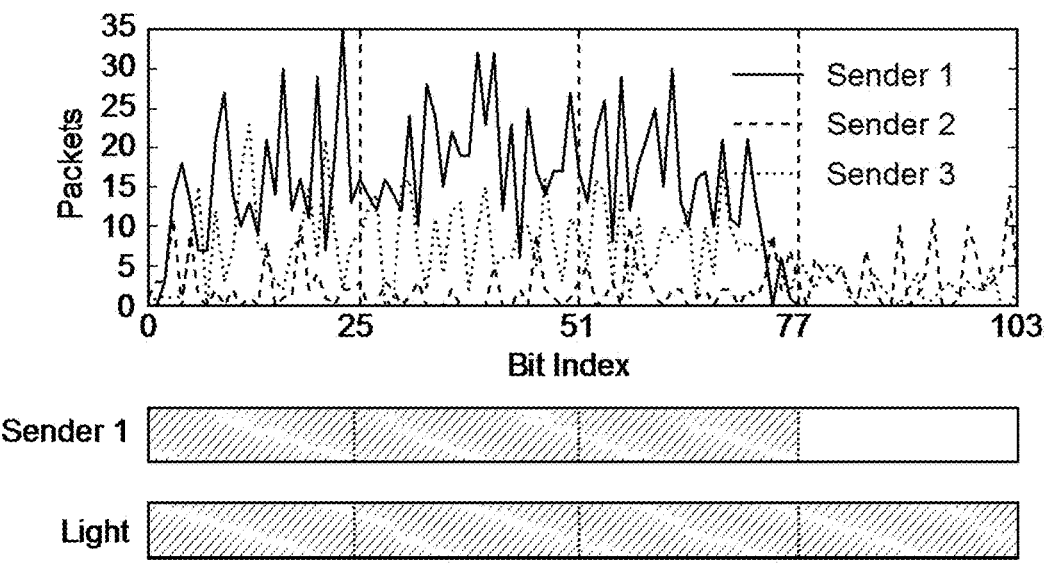
FIG. 7 is an example network traffic observed with the harmonizing controller in place.

FIG. 7 shows the observed network packets after Wi-FM has implemented its schedule. First, note that Sender 1 generates the most traffic, and is generally dominating the network airtime. However, it is shown that after bit 77 (e.g., the end of block C), Sender 1 stops sending, and allows the light flows to operate unhindered during block D. Another version of this plot (not shown) can indicate that while Sender 3 sends a large number of packets during slots A, B, and C, it sends a significantly fewer bytes relative to Sender 1.

Consider three conditions: the first is the light flows in isolation, when the light flows sent by Senders 2 and 3 do not have to share air time with the heavy flow generated by Sender 1, denoted by "Light". Next, consider the light flows alongside the heavy flows, with no scheduling and just traditional DCF, denoted by "Light+Heavy". Finally, consider the case where the harmonizing controller 120 is used to schedule the heavy flows for blocks A, B, and C, e.g., ¾ of the time. Light flows are left unscheduled. The scenario can be denoted by "WiFM With Both."

Figure 8:
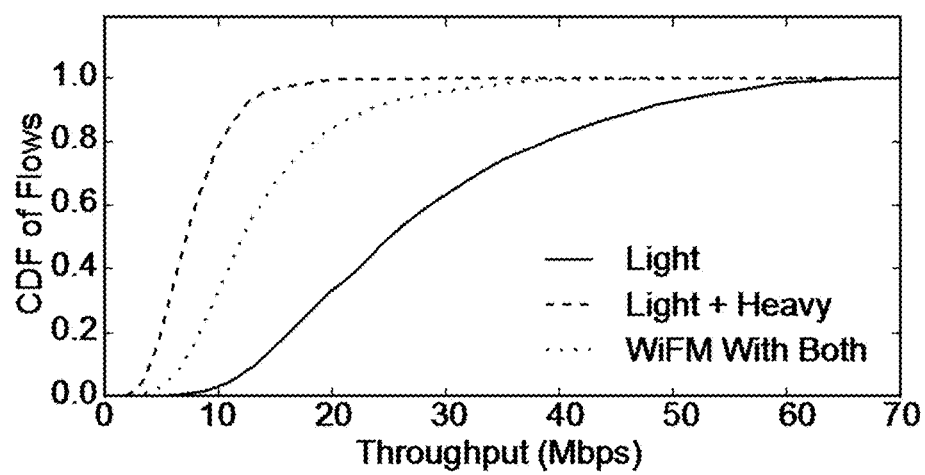
FIG. 8 is an example throughput of the light flows when the light flows are alone, the light flows compete with a heavy upload, and the harmonizing controller is managing the heavy flows, respectively.

FIG. 8 shows a CDF of the throughput of the light flows for the three conditions. As expected, the difference at the median between the light-alone case and the light+heavy case is significant: nearly 20 Mbps. Once the heavy-hitter flow joins the network, it dramatically affects performance of the light flows. By running the harmonizing controller 120 just at the heavy hitter STA, the median case sees an increase in throughput of 8.2 Mpbs, making a more acceptable environment for the light flows. Below that the impact on the latency is even more significant.

The throughput of the heavy flow (not shown in the figure) is smaller in the "WiFM With Both" scenario than in the "Light+Heavy" scenario. The difference is almost exactly in proportion to its schedule, e.g., 48 Mbps relative to 68 Mbps without the harmonizing controller 120. Such necessary performance tradeoffs are not understood as pure altruism demonstrated by Sender 1. It is rather a collaborative effort that can equally help Sender 1 in a reversed scenario, e.g., when some other source is a heavy hitter. Demonstrated later are concurrent win-win scenarios, in which substantial throughput improvements are achievable for all senders.

Figure 9:
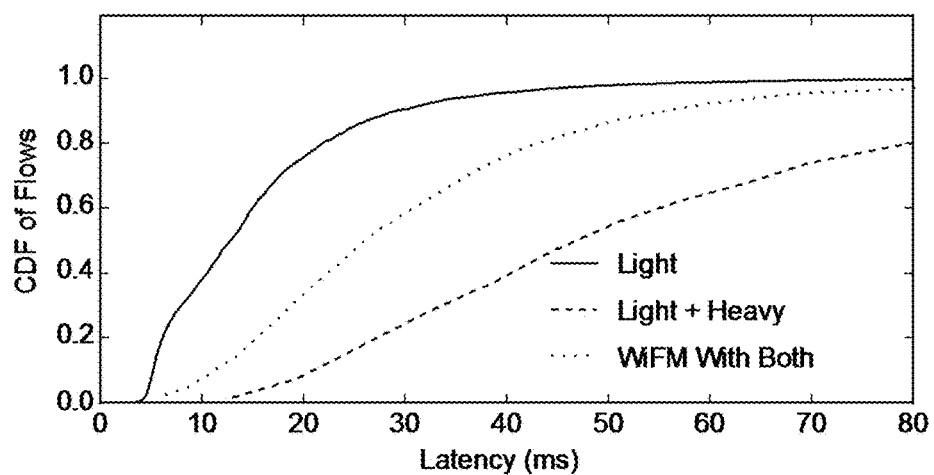
FIG. 9 is an example time to the first byte of the reply for the light flows in the three scenarios of FIG. 8.

FIG. 9 shows similar performance for response latency of the light flows. The latency of these flows is significantly degraded when the heavy-hitter joins the network, e.g., the median latency increases by more than 40 ms. The harmonizing controller 120 enables a much better environment for light flows such that the median latency improves by nearly 20 ms. Moreover, the latency improvement is particularly significant at the tail of the distribution. For example, more than 40 ms for the 80-percentile latency. With the negative schedule in place, the light flows experience less competition in the air, hence, improve their performance.

1) Down-link Scenario: Next consider a scenario in which there is significant down-link traffic. This is a common case in home and commercial networks, given the increasing popularity of streaming video services (e.g., Netflix™, Hulu™, Amazon™, etc.). This case is further complicated by the fact that the AP becomes the heavy hitter. However, if the harmonizing controller 120 enforces node-level schedules on the AP, performance to other STAs can also be impacted. To resolve this inter-dependency, the harmonizing controller 120 allows APs to determine heavy hitters on a per-destination basis, restricting traffic only to those destinations pulling significant amounts of data. In this case, the harmonizing controller 120 on the AP detects that there is a heavy hitter alongside light flows, which may be occurring in the same or different networks, and therefore implements the ¾ negative schedule for only the heavy hitter destination.

In the down-link case, model the light flows as before, but now generate a large transfer from the AP to a single STA for the five minutes of the example. Again consider three relevant scenarios, e.g., "Light," "Light+Heavy," and "Wi-FM With Both". Showing the results is omitted since they are similar to the up-link scenario. An exception is that the latency performance in the down-link scenario for "Wi-FM With Both" becomes much closer to the "Light" scenario, e.g., the median distance is less than 5 ms.

B. Heavy Single-Sourced Traffic Scenario

Here, a heavy-hitter (call it Sender 1) is generated in Network I. In addition, light background traffic is generated in the neighboring Network II. Then, a new heavy-hitter (call it Sender 2), joins Network II. Below explains how the harmonizing controller 120 behaves in such a scenario. Further note that the senders can be APs or STAs: the procedure is generic.

FIG. 10A shows the network state before Sender 2 joins. Initially, Sender 1 has converged to the three-slot scenario due to light background traffic from network II (not shown in the figure). Based on the neighborhood harmonization algorithm, Sender 2 broadcasts in half of possible time slots, 2 RDS blocks in this case. Sender 2 is able to observe that block D is currently available, hence it selects it. Of the remaining blocks, it randomly selects a block with equal contention, e.g., any of the remaining blocks, in this case block B.

FIG. 10B presents a sample of the network traffic after Sender 2 has begun transmitting. See that now Senders 1 and 2 competes for block B. Blocks A and C are used only by Sender 1, while block D is utilized exclusively by Sender 2. Thus, after Sender 1 scans the network again, it discovers the presence of Sender 2, and recognizes that it is sharing the network with a single additional heavy hitter. Sender 2 therefore reduces to 2 blocks and takes those with no contention. FIG. 10C demonstrates the state of the network after this change. Both nodes 106 can be seen taking their fair share of the network, avoiding contention on any block.

Figure 11:
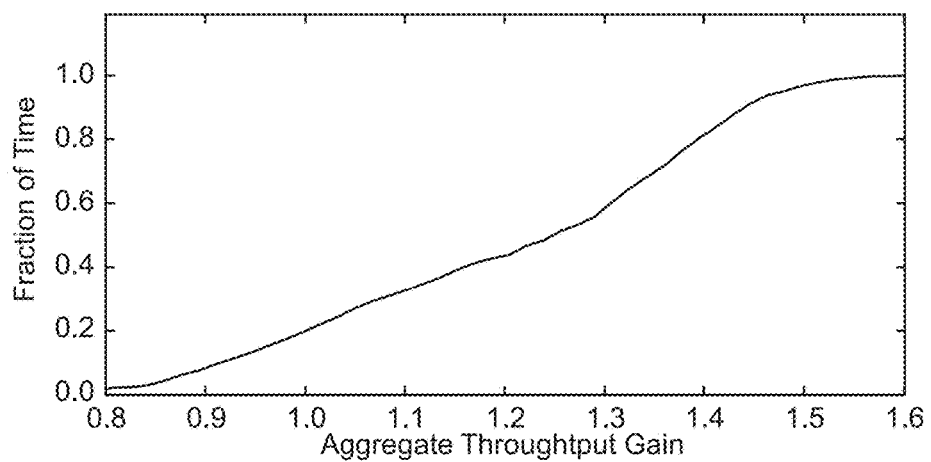
FIG. 11 is an example aggregate throughput gain over the pure unscheduled network.

FIG. 11 shows the cumulative distribution of aggregate throughput gains sampled every second over 10 minutes seen by the harmonized network case over the 10-minute average of the pure non-harmonized network case. In particular see that at least 80% of the time, the throughput increases. In at least 50% of the time, the throughput increases by 20% or more. Finally, in at least 20% of the time, these gains are greater than 40%.

C. Heavy Multi-Sourced Traffic Scenario

Next consider a more complex case with multiple heavy hitters. In particular, consider the case when a new heavy hitter arrives, samples the network traffic, and finds all time slots to be fully allocated.

Figure 12A:
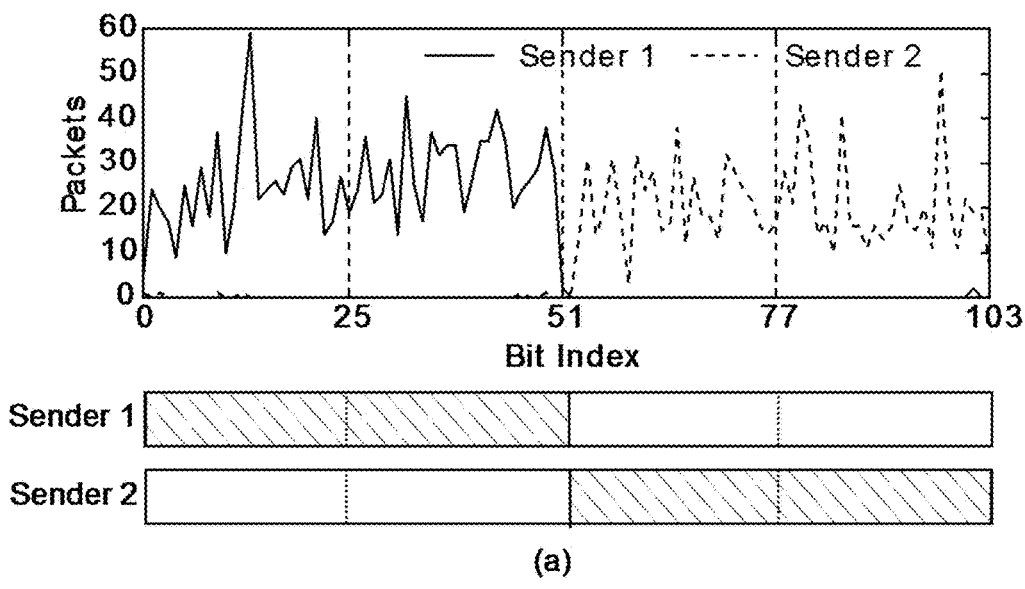
FIGS. 12A-B are an example of packets observed from a two senders folded onto the bit indices, and packets observed after Sender 3 joins, respectively.
Figure 12B:
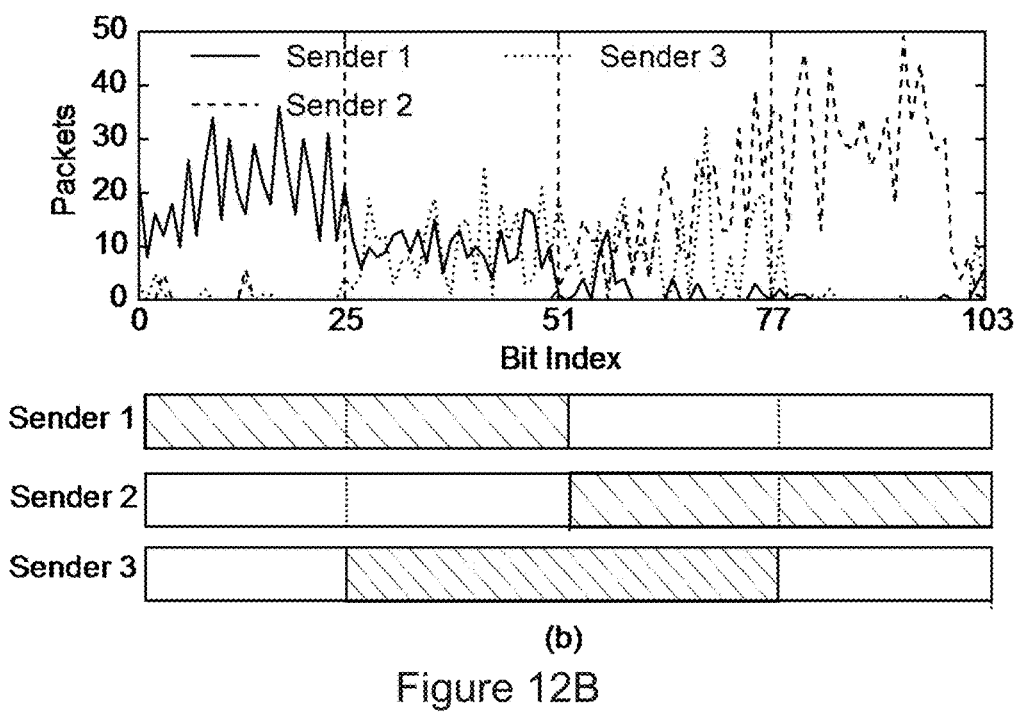

FIGS. 12A-B are an example of packets observed from a two senders folded onto the bit indices, and packets observed after Sender 3 joins, respectively. In FIG. 12A, Sender 1 from network I is broadcasting in both blocks A and B, and Sender 2 from network II is broadcasting in blocks C and D. The arriving Sender 3 observes that Sender 1 and Sender 2 are both broadcasting for 2 blocks worth of time. Therefore, Sender 3 also chooses 2 blocks worth of time, for its fair share. Next, Sender 3 selects the times which minimize the number of total senders in each block. However, since all blocks are occupied, and any choice of 2 blocks results in a maximum of two concurrent senders, Sender 3 is able to choose any blocks to maintain levels of radio sharing. Finally, Sender 3 selects randomly, and in this particular case selects blocks B and C.

FIG. 12B shows the network state after Sender 3 joins the network. While there is contention for the medium, by leaving DCF intact, the harmonizing controller 120 is still able to function without having to communicate a schedule to the existing senders. FIG. 12B shows that there is some spill over between time slots, which is an artifact of an example implementation: since the schedules are enforced before the driver, any network level delays to packet transmission can be handled by the driver. Therefore lower level re-transmits may still occur outside of the time slot. Such issues can be solved with tight integration between devices drivers and the harmonizing controller 120.

Figure 13:
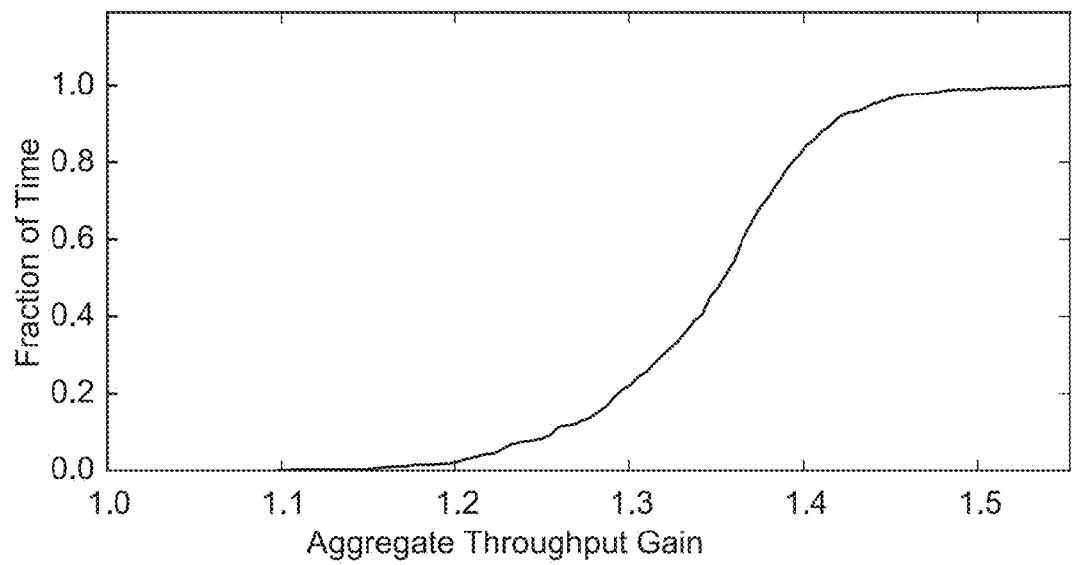
FIG. 13 is an example aggregate throughput gain over the un-harmonized scenario.

FIG. 13 shows the cumulative distribution of aggregate throughput gains seen by the harmonized network case over the non-harmonized network case. Here, the harmonized network throughput was always above the non-harmonized network case. The gain is distributed between 20% and 50% over the non-Wi-FM case, with the median at about 35%. It is emphasized that all three senders are connected to different APs, and therefore are not able to communicate directly. However, by using the harmonizing controller 120, they avoid creating worst-case contention scenarios and improve the aggregate throughput of all networks involved.

VII. Discussion

A hardware implementation can likely reduce the complexity of the system. In particular, moving the relatively straightforward radio processing to a small dedicated circuit can eliminate much of the overhead in an example current implementation and improve the accuracy. Moreover, a hardware implementation can open the door for integration with more complex systems, e.g., advanced distributed MIMO. Tight integration with the wireless card can further improve the situation by controlling the sending directly, rather than via the kernel queuing disciplines. While such adjustments can improve the response time to the radio, examples in Section V demonstrate that the current system provides sufficient performance in these regards.

CONCLUSIONS

The ubiquitous in-the-air FM radio availability, accompanied by the thriving on-device FM receiver hardware proliferation, provides an opportunity to utilize the omnipresent signal beyond its common purpose. FM radio 130, e.g., the RDS signal 101 associated with it, provides a common medium that enables FM-enabled devices to effectively harmonize their transmissions. The network harmonization system can enable harmonization beyond administrative network bounds. Advantages can include following: (i) The RDS digital signal accompanying FM radio has a sufficient structure to enable RDS-relative harmonization. (ii) This signal is highly resilient to data loss, e.g., it retains device harmonization even in the presence of substantial reductions in matching bits. (iii) RDS can be utilized to realize device harmonization in a completely autonomous fashion. (iv) Distributed harmonization lies in RDS-relative synchronization, which enables nodes 106 to effectively infer others' scheduling choices. (v) An example approach requires no explicit communication among devices, enabling harmonization in unmanaged network scenarios, beyond administrative network bounds. (vi) Hence, it opens the door to a cross-domain network policies in such unmanaged scenarios. (vii) This is achievable in a completely incrementally-deployable fashion. Hardware-level FM radio signal processing implementations can open the doors to the deployment of advanced wireless networking algorithms and applications.

Figure 14:
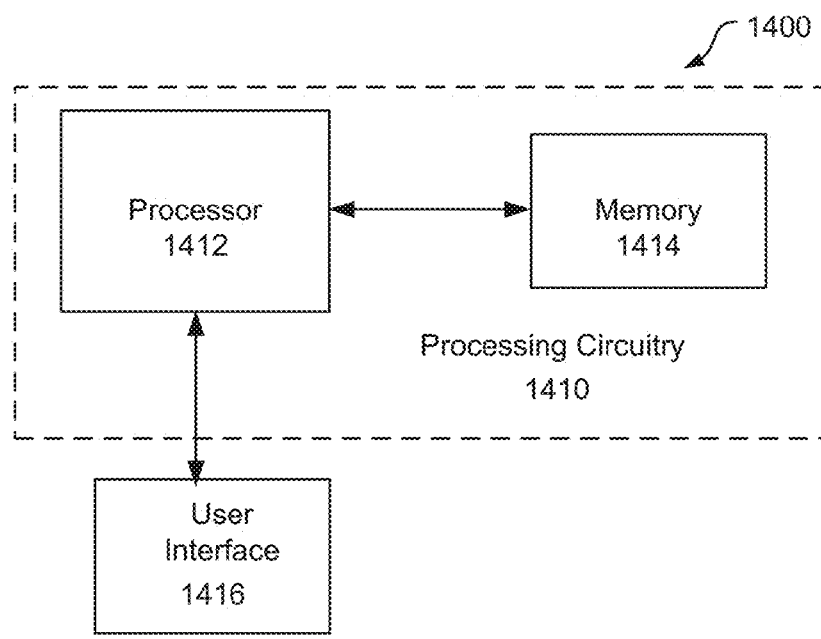
FIG. 14 is a block diagram of an example computing system.

FIG. 14 is a block diagram of an example computing device 1400. The systems and methods described above may be implemented in many different ways in many different combinations of hardware, software firmware, or any combination thereof. In one example, the computing device 1400 may enable the harmonization network architecture. It can be appreciated that the components, devices or elements illustrated in and described with respect to FIG. 14 below may not be mandatory and thus some may be omitted in certain embodiments. Additionally, some embodiments may include further or different components, devices or elements beyond those illustrated in and described with respect to FIG. 14.

In some example embodiments, the computing device 1400 may include processing circuitry 1410 that is configurable to perform actions in accordance with one or more example embodiments disclosed herein. In this regard, the processing circuitry 1410 may be configured to perform and/or control performance of one or more functionalities of the harmonizing controller 120. The processing circuitry 1410 may be configured to perform data processing, application execution and/or other processing and management services according to one or more example embodiments. In some embodiments, the computing device 1400 or a portion (s) or component(s) thereof, such as the processing circuitry 1410, may include one or more chipsets and/or other components that may be provided by integrated circuits.

In some example embodiments, the processing circuitry 1410 may include a processor 1412 and, in some embodiments, such as that illustrated in FIG. 14, may further include memory 1414. The processor 1412 may be embodied in a variety of forms. For example, the processor 1412 may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it can be appreciated that the processor 1412 may comprise a plurality of processors. The plurality of processors may be in operative communication with each other and may be collectively configured to perform one or more functionalities of the computing device 1400 as described herein. In some example embodiments, the processor 1412 may be configured to execute instructions that may be stored in the memory 1414 or that may be otherwise accessible to the processor 1412. As such, whether configured by hardware or by a combination of hardware and software, the processor 1412 is capable of performing operations according to various embodiments while configured accordingly.

In some example embodiments, the memory 1414 may include one or more memory devices. Memory 1414 may include fixed and/or removable memory devices. In some embodiments, the memory 1414 may provide a non-transitory computer-readable storage medium that may store computer program instructions that may be executed by the processor 1412. In this regard, the memory 1414 may be configured to store information, data, applications, instructions and/or the like for enabling the computing device 1400 to carry out various functions in accordance with one or more example embodiments. In some embodiments, the memory 1414 may be in communication with one or more of the processor 1412, the user interface 1416 for passing information among components of the computing device 1400.

While various embodiments have been described, it can be apparent that many more embodiments and implementations are possible. Accordingly, the embodiments are not to be restricted.

We claim:

1. A system, comprising:
a wireless node in a wireless network, the wireless node including a scheduler;
a harmonizing controller connected with the wireless node, the harmonizing controller including a processor and a memory, where the memory stores instructions, which when executed by the processor, causes the processor to:
receive an ambient radio signal;
process the ambient radio signal to determine bits of the signal, where the processing comprises identify time landmarks in a form of repeated patterns in a structure of a radio data system (RDS) signal; and
synchronize a wireless schedule of the scheduler with a schedule of other nodes based on the bits from the ambient radio signal to perform neighborhood harmonization without explicit communications between the wireless node and the other nodes in the wireless network.

2. The system of claim 1, further comprising generate no in-band traffic while synchronizing.

3. The system of claim 1, further comprising no in-band beacons nor additional node-to-node synchronization.

4. The system of claim 1, where the ambient radio signal comprises a frequency modulated (FM) signal.

5. The system of claim 1, where the wireless node comprises a Wi-Fi station or access point.

6. The system of claim 1, where the time landmarks comprise a program identifier.

7. A method, comprising:
determining, by a processor, synchronization bits from an ambient radio signal where the determining comprises identifying time landmarks in the form of repeated patterns in a structure of a radio data system (RDS) signal; and
harmonizing, by the processor, a plurality of nodes on a wireless network based on the synchronization bits from the ambient radio signal, where the plurality of nodes are transmitting in a same channel, and the plurality of nodes are harmonized without explicit communications between the plurality of nodes even when the plurality of nodes belong to an independently-managed autonomous wireless network.

8. The method of claim 7, further comprising:
sensing by the plurality of nodes an environment; and
inferring other node scheduling choices over short timescales based on the synchronization bits.

9. The method of claim 8, further comprising:
differentiating between quiet, light traffic and heavy traffic in the environment;
providing for full use of the wireless network in quiet cases; and
sharing of the wireless network during light traffic via negative scheduling, and via a neighborhood fairness algorithm and during heavy traffic.

10. The method of claim 9, further comprising determining nodes of the plurality of nodes with heavy traffic on a per-destination basis.

11. The method of claim 7, further comprising identifying time landmarks in a form of repeated patterns in the structure of the ambient radio signal.

12. A method, comprising:
receiving an ambient radio signal;
processing the ambient radio signal to determine synchronization bits from the signal, where the processing comprises identifying time landmarks in the form of repeated patterns in a structure of a radio data system (RDS) signal; and
synchronizing a wireless schedule for a plurality of nodes based on the synchronization bits from the ambient radio signal to perform neighborhood harmonization of the plurality of nodes without explicit communications between the plurality of nodes.

13. The method of claim 12, further comprising generating no in-band traffic while synchronizing.

14. The method of claim 12, further comprising providing no in-band beacons nor additional node-to-node synchronization.

15. The method of claim 12, where the ambient radio signal comprises a frequency modulated (FM) signal.

16. The method of claim 12, where the wireless schedule comprises a Wi-Fi schedule.

17. The method of claim 12, where the time landmarks comprise a program identifier.

* * * * *